ROBERTS & COX.
Thrashing Machine.
No. 8,480. Patented Oct. 28, 1851.
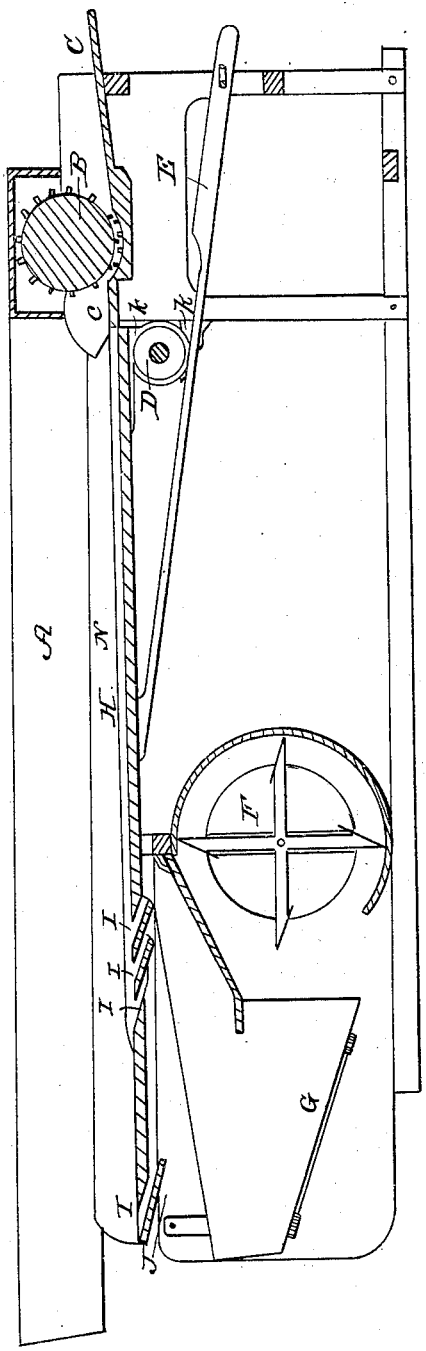
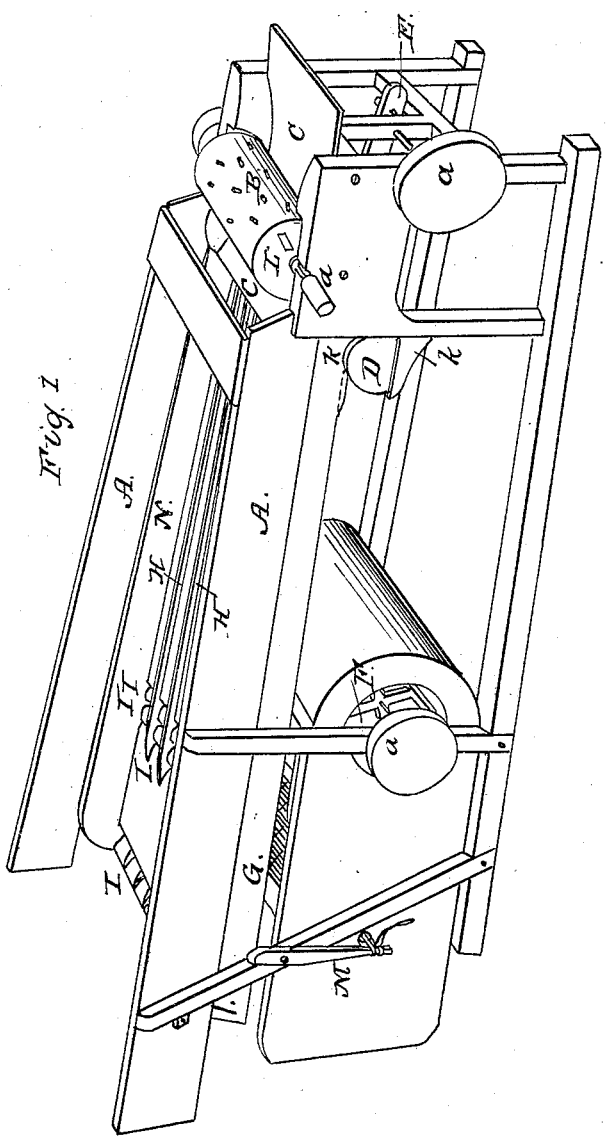

UNITED STATES PATENT OFFICE.

CYRUS ROBERTS AND JOHN COX, OF BELLEVILLE, ILLINOIS.

THRESHING AND SEPARATING GRAIN.

Specification of Letters Patent No. 8,480, dated October 28, 1851.

*To all whom it may concern:*

Be it known that we, CYRUS ROBERTS and JOHN COX, of Belleville, St. Clair county, and State of Illinois, have invented a new and useful Improvement in the Construction of Machines for Threshing and Cleaning Grain; and we do hereby declare that the following is a full and clear description of the construction and operation of the same, reference being had to the annexed drawings, making a part of this specification, in which—

Figure 1, is a perspective view. Fig. 2, is a longitudinal elevation of the same.

Similar letters referring to similar parts in the several figures.

To enable others skilled in the art to make and use our invention we will proceed to describe its nature, construction and operation.

Letter A, Fig. 1 is the framework of the machine; B, threshing cylinder; C, concave and feed board; D, jumping wheels; E, pitman; F, fan blast; G, shaking shoe; H H, longitudinal ribs or bars; I I I I, receivers or apertures; J, tail blast board; K K, brackets with track for the jumping wheels; L, knives for cutting out the straw passing over the cylinder end; "*a a a*" pulleys; "*c*" apron of sheet iron or leather for conducting the straw and grain from the cylinder to the separator.

The nature of this invention consists first in the insertion of knives with certain curves into the end of the threshing cylinder, whereby all the straw or dirt that in the commonly used threshing machine passes over the end of the cylinder, and becoming twisted upon the shaft is entirely cut up and thrown out removing the necessity for stopping such machine for the purpose of cleaning as heretofore practiced. Also in the construction of the separator, or "shaker," with longitudinal ribs or bars, and transversely oblique slatted receivers or apertures, which have the effect of detaching the grain from the straw in a much more perfect manner than by any machines now in use, the straw being held separate from the grain while the grain is passed downward through the receivers, and thrown into the screen or shaking shoe. Any loss of grain that would arise from irregular feeding being prevented by the passage of the straw over a second "receiver," and for the cleaning of oats, barley or wet wheat the "tail blast board" is used. And by the peculiar effects obtained by the arrangement of the "jumping wheels" D. This feature in the invention is one of some importance, as by the action of the wheels when on their descent the separator is much more suddenly and effectively withdrawn from under the straw or grain, insuring the discharge of the separator however rapid the feeding may be.

The construction is as follows: The framework A, may be made in any ordinary way. B, is also made in the usual form, the concave and feed-board C, are also of the ordinary kind. D, represents two jumping wheels, those wheels are inclosed in part by two concave brackets, with tracks on their concave faces for the reception of the wheels, they must be so placed that when the pitman is pressed out the wheels will ascend the track on the brackets carrying on their upper side the separator, and not allowing any lateral motion. When the wheels are raised so as to permit the crank to turn its center they are jumped backward, imparting a sudden impulse to the straw and grain on the separator.

E, is a pitman for giving motion to the separator.

F, is an ordinary arrangement of the fanning-mill. G, shaking shoe or screen.

H H, are longitudinal ribs or bars laid on the face of the separator floor and formed of timber or other material, and reaching from the bottom of the thresher to any convenient point between the receivers, the floor of the separator is not perforated as usual, but a tight surface with the exception of the receivers I I I I. The receivers are made by introducing oblique slats through openings in the floor of the separator, the heels of the slats inclining toward the blast and discharging the grain upon the screen or shaking shoe.

J, is a board that is used when oats, barley, or wet wheat is being threshed, and cleans oats or barley without the use of the screen, and also for the collection of "tailings."

K K, are made in the usual form of brackets, having concave tracks for elevating the wheels D, upon.

L is an arrangement of a knife in each end of the threshing cylinder, these knives are formed with a curve, so as to cut the straw that would otherwise clog and twist around the cylinder shaft, the curve is important, as it can be made to act as a "fan" to blow the dirt out. M, is the common spring used on fanning mills.

The operation is as follows. The machine is fed in the ordinary way. When the threshed matter passes the thresher it falls on the separator or shaker, and by the action of the jumping wheels is passed forward to the receivers, the most of the grain passes immediately down to the screen, any that might pass over is received into the last aperture. The blast can be thrown up through the receivers so as to leave but little work for the screen. When oats, barley, or wet wheat is to be threshed the "tail blast board" is needed and at no other time.

The operation of the knife is as follows: Any straw that passes between the cylinder and sides of the frame work is instantly cut to pieces and thrown out by the rapid radiation of the curved knives. Very serious delays are thus saved, rendering it entirely unnecessary to stop the machine as is usual for the puropse of cleaning out the straw that has wrapped around the shaft.

The operation of the longitudinal ribs upon the threshed matter is in sustaining the straw above the bed of the separator while the interval spaces conduct the grain to the receivers.

What we claim as our invention and desire to secure by Letters Patent is—

1. The method herein described of constructing threshing cylinders with curved knives, or otherwise shaped, in the ends for the purposes herein described.

2. Also the method already described of working the separator by means of the jumping wheels and concave tracked brackets, or by any modification of it whereby the action is substantially the same.

CYRUS ROBERTS.
JOHN COX.

Witnesses:
F. M. MIDDLECOFF,
THOMAS W. McBRIDE.